Figure 1:
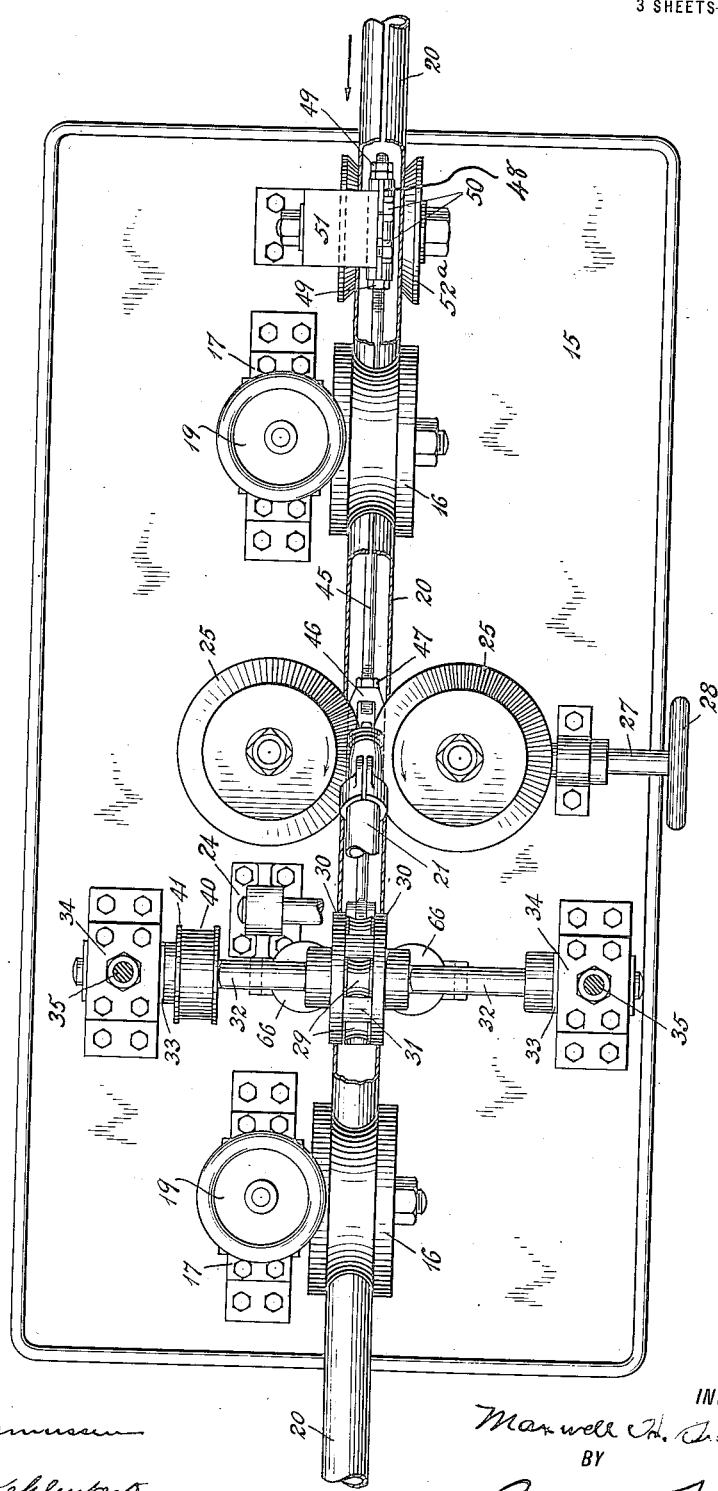

M. H. SUSSMAN.
APPARATUS FOR WELDING JOINTS.
APPLICATION FILED JULY 8, 1920.

1,436,062.

Patented Nov. 21, 1922.
3 SHEETS—SHEET 1.

WITNESSES

INVENTOR
BY
ATTORNEYS

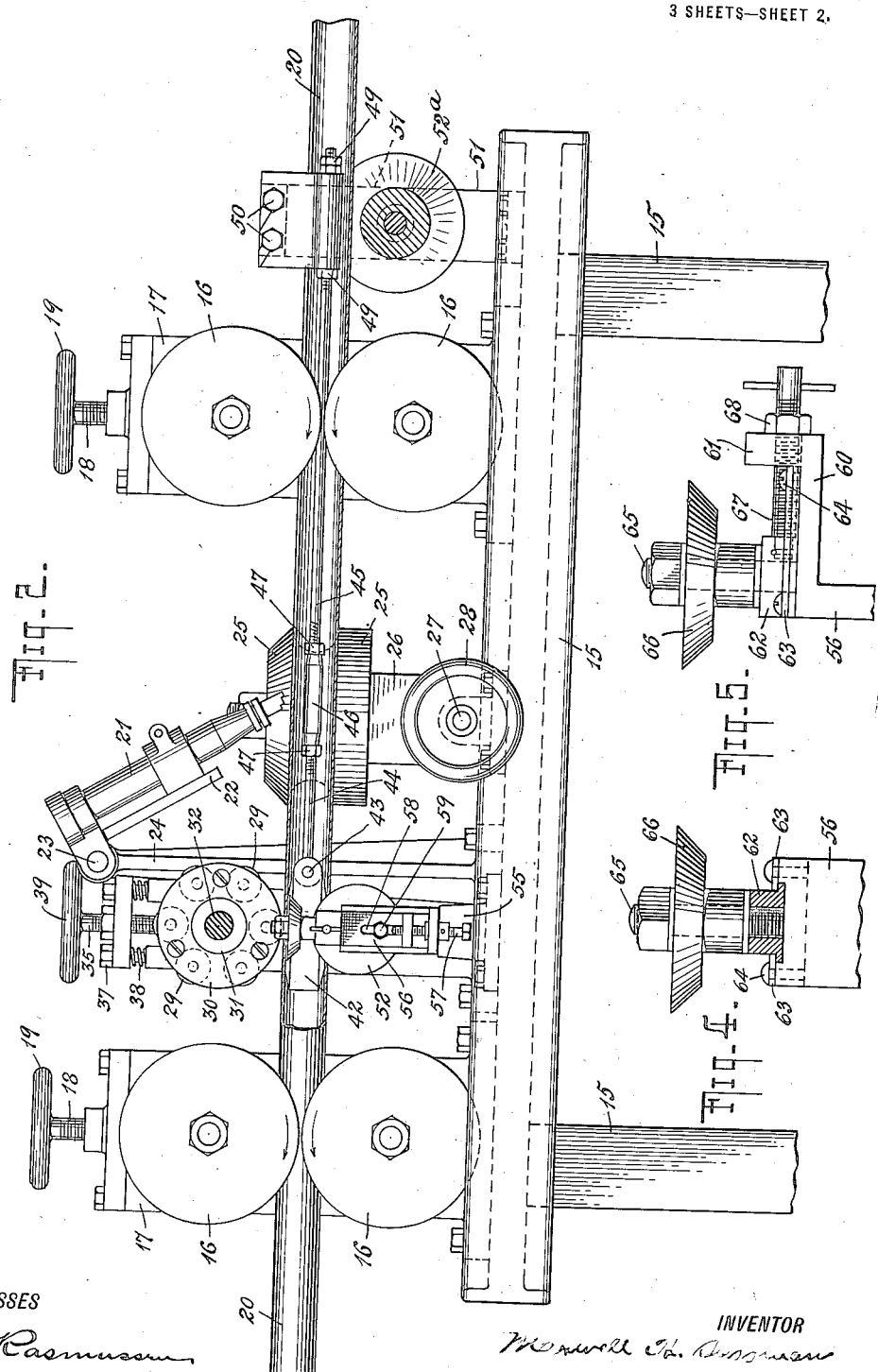

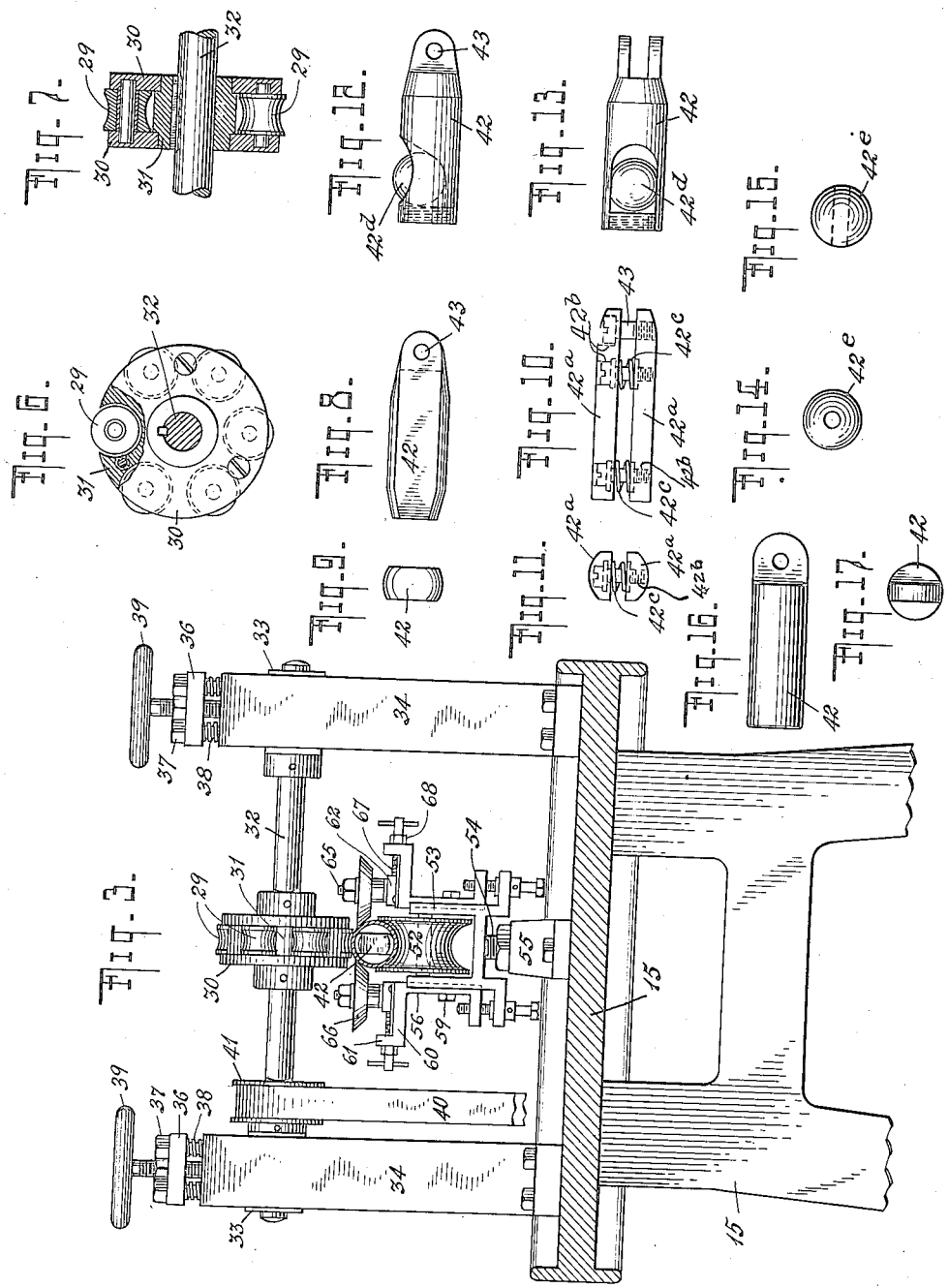

Patented Nov. 21, 1922.

1,436,062

UNITED STATES PATENT OFFICE.

MAXWELL H. SUSSMAN, OF NEW YORK, N. Y., ASSIGNOR TO MOHEGAN TUBE CO., OF BROOKLYN, NEW YORK, A CORPORATION OF NEW YORK.

APPARATUS FOR WELDING JOINTS.

Application filed July 8, 1920. Serial No. 394,748.

*To all whom it may concern:*

Be it known that I, MAXWELL H. SUSSMAN, a citizen of the United States, and resident of Kew Gardens, borough and county of Queens, city and State of New York, have made certain new and useful Improvements in Apparatus for Welding Joints, of which the following is a specification.

My invention relates to welded joints and more particularly to the joints of welded tubing and kindred elements and has for its object to provide a novel and improved apparatus whereby welded metal and especially welded tubing or its equivalent having the appearance of being seamless may be readily produced. Other more specific objects of my invention will appear from the description hereinafter and the features of novelty will be pointed out in the appended claims.

In the accompanying drawings, which illustrate an example of the apparatus without defining the limits of the invention, Fig. 1 is a plan view; Fig. 2 is a side elevation; Fig. 3 is an end elevation; Figs. 4 and 5 are detail views of side rollers forming part of the apparatus; Figs. 6 and 7 are detail views of a rotatable hammer forming part of my invention, and Figs. 8 to 17 inclusive, are detail views illustrating different forms of an anvil plug, which constitutes part of the invention.

For the sake of clearness I have chosen to illustrate and describe the invention in connection with the production of welded tubes, it being understood that this is only an example and that the limits of the invention are not defined thereby. In carrying out the process the previously formed tube or its equivalent is subjected to the action of heat at the seam whereby the metal is softened along said seam, the contiguous edges of said tube or its equivalent being coincidentally pressed toward and into firm contact with each other. After this has been done and while the metal is still soft the tube or its equivalent is subjected, subsequently to the formation of the weld, to a series of impacts or blows at said seam which blows are resisted from the inside of said tube or its equivalent so that the metal is rigidly and securely joined at said weld, all visible evidence of which is substantially obliterated, thus giving to the tube or its equivalent the appearance of being seamless. Any suitable means may be utilized for carrying out the process as for instance the novel apparatus illustrated in the drawings.

As shown this apparatus may comprise a supporting frame 15 of suitable form and dimensions on which pulling rollers 16 are mounted upon standards 17 and driven in any convenient manner, said rollers being preferably arranged so as to be adjustable toward and away from each other, for instance by means of screws 18 and hand wheels 19. The peripheral surfaces of said rollers 16 are preferably shaped in accordance with the cross-sectional form of the tube or its equivalent which is being welded and in the illustrated example are provided with circumferential grooves as shown in Fig. 1 having curvatures corresponding approximately to the shape of the tube 20 being welded.

The heat whereby the metal is welded may be provided in any well known way, either electrically, by means of an oxyacetylene flame or otherwise, the illustrated example including an oxy-acetylene torch 21 of conventional form and type for this purpose. The torch 21 is carried by a torch support 22 fixed upon a shaft 23 which is rotatably mounted in a bracket 24 so as to be frictionally or otherwise held in an adjusted position, the bracket 24 in turn being secured to the frame 15 and projecting upwardly therefrom as shown in Fig. 2. Horizontal welding rollers 25 are located in registry with the point at which the heat from the torch 21 is applied and engage the tube 20 at opposite sides, the peripheries of said welding rollers being also preferably shaped to fit said tube. The rollers 25 are journalled upon bearings 26 and are preferably mounted so as to be adjustable toward and away from each other, for instance by means of an adjusting screw 27 and hand wheel 28.

In the illustrated form of the apparatus the means whereby the impacts or blows are delivered to the tube or its equivalent comprises a rotatable hammer consisting of a series of rollers 29 journalled between parallel disks 30 and projecting beyond the peripheries thereof as shown in Figs. 6 and 7. The disks 30 are fixed upon a holder 31 which in turn is secured upon a shaft 32 above and in registry with the path of the tube through the apparatus; the shaft 32 is journalled in bearing boxes 33 vertically slidable in bearing brackets 34 secured upon and projecting upwardly from the frame 15. Adjusting screws 35 are preferably connected with the boxes 33 and pass through and are in screw-threaded engagement with caps 36 which in turn are resiliently mounted upon the brackets 34 by means of screws 37 and springs 38; suitable hand wheels 39 or their equivalents are provided for manipulating the screws 35. With this arrangement the rotatable hammer is vertically adjustable and in all positions is resiliently mounted, said hammer being driven in any convenient manner as by means of a belt 40 and pulley 41, the latter being fixed upon the shaft 32.

The means whereby the impacts or blows of the rotary hammer on the tube 20 are resisted from the inside comprises an anvil 42 located within the tube 20 in registry with the point at which the hammer blows are delivered. The anvil 42 may be in the form of a simple plug as shown in Figs. 2, 8 and 9 or 16 and 17, or it may consist of duplicate members 42$^a$ resiliently connected by means of screws 42$^b$ and springs 42$^c$ as shown in Figs. 10 and 11 or said anvil may comprise a plug 42 recessed to receive a ball 42$^d$ as illustrated in Figs. 12 and 13, or as shown in Figs. 14 and 15 said anvil may comprise a sphere 42$^e$ of suitable material. In all of its forms the anvil 42 is pivotally connected at 43 with a two-part rod, the sections 44 and 45 of which have their opposed ends in screw-threaded engagement with a turn-buckle 46; lock-nuts 47 may be provided for securing the turn-buckle against unintentional rotation. The rod section 45 is further in screw-threaded connection with a guide plate 48 and is adjustably fixed thereto by means of lock-nuts 49; the guide plate 48 extends through the seam of the tube 20 and is fastened by means of bolts 50 or their equivalent to a support 51 which projects upwardly from and is secured to the frame 15. The parts are so proportioned and arranged that the turn-buckle 46 is located in registry with the torch 21 or its equivalent and always in an approximately horizontal position so that when the torch is in action and no tube or part thereof is beneath the same, the flame of said torch will pass through the opening of said turn-buckle without injuring the latter or any of the adjacent elements.

In order to support the tube 20 from below, particularly in the region where it is subjected to the blows of the rotary hammer, it is preferable to provide rollers 52 and 52$^a$ over which said tube passes the roller 52 being preferably located in alignment with the rotary hammer and being journalled in a bracket 53 adjustably mounted by means of a screw 54 upon a support 55 carried by the frame 15; the roller 52$^a$ may be rotatably mounted upon the support 51. The bracket 53 is provided with vertical grooves in which members 56 are slidably mounted, and shiftable in vertical directions in any suitable manner as for instance by means of adjusting screws 57 rotatably mounted upon the bracket 53 but held against axial movement relatively thereto. In order that the members 56 may be fixed in an adjusted position they may be slotted as at 58 for the accommodation of locking screws 59, it being understood that any other suitable means may be substituted if desired. The members 56 include preferably integral horizontal legs 60 recessed in the direction of their length and formed at their outer ends with upright extensions 61 as shown in Fig. 3, blocks 62 being slidably mounted in the recesses of said legs 60 and held therein in any convenient manner as by means of gibs 63 fastened in place by means of screws 64. Studs 65 are carried by and project upwardly from the blocks 62 and constitute bearings for side rollers 66, the latter being so located as to engage the tube 20 from opposite sides and being preferably provided with bevelled peripheries as illustrated in Figs. 3, 4 and 5. The side rollers 66 are adjustable toward and away from each other by means of adjusting screws 67 connected with the blocks 62 and extending through and in screw-threaded engagement with the extensions 61, suitable lock-nuts 68 being preferably provided for maintaining said screws against unintentional actuation.

In the operation of the machine the tube 20 is fed along with the seam upward and passes over the roller 52 and the guide plate 48 to the pulling rollers 16; continuing the tube 20 travels beneath the torch 21, the flame of which serves to soften the metal along the seam, said tube coincidentally passing between the welding rollers 25 which exert a pressure whereby the opposed edges of said tube at the seam are forced together to form the weld. After having been subjected to the action of said torch 21 the tube 20 passes over the anvil plug 42 and roller 52 and beneath the rotary hammer which being in rotation, causes the hammer rollers 29 to successively deliver a series of blows upon the tube which are resisted from the inside of said tube by the anvil plug 42. The metal being still soft, at this stage, the action of said hammer serves to forge the same as it were and thus efficiently completes the weld and at the same time obliterates all evidence thereof thus giving to the tube the appearance of being seamless. After being thus completely welded the tube continues along between the second set of rollers 16 and passes out of the machine. Any one of the different forms of anvil plugs shown in Figs. 8 to 15 inclusive may be substituted for the one illustrated in Fig. 2.

The illustrated apparatus is particularly adapted for carrying out said process and is efficient in operation and of simple construction requiring no particularly skilled attention.

Various changes in the specific form shown and described may be made within the scope of the claims without departing from the spirit of my invention.

I claim:

1. An apparatus for welding joints comprising means for softening the metal along the joint to form a weld, means for feeding the metal in operative relation to said softening means, and means, including a plurality of impact devices located in registry with said joint and its path of movement, whereby said metal is forged subsequently to the welding thereof.

2. An apparatus for welding tubes comprising means for softening the metal along the seam, means for coincidentally pressing the metal of the tube together at said seam to form the weld, means whereby said tube is fed in operative relation to said softening means, and means, including a plurality of impact devices located in registry with said seam and its path of movement, for delivering successive blows upon said tube along the seam thereof to forge the metal subsequent to the formation of the weld.

3. An apparatus for welding tubes comprising a welding torch, means for feeding said tube beneath said torch whereby the metal along the seam is softened, rollers for pressing said tube together at said seam whereby the weld is formed and a rotatable hammer located in close proximity to said torch and rotatable about an axis transverse to the seam for delivering successive blows upon said tube along the seam thereof subsequent to the formation of said weld.

4. An apparatus for welding tubes comprising a welding torch, means for feeding said tube beneath said torch whereby the metal along the seam is softened, rollers for pressing said tube together at said seam whereby the weld is formed, a rotatable hammer movable about an axis transverse to that of the tube for delivering a series of blows upon said tube along the seam thereof subsequent to the formation of said weld and means within said tube for resisting the blows of said hammer.

5. An apparatus for welding tubes comprising a welding torch, means for feeding said tube beneath said torch whereby the metal along the seam is softened, rollers for pressing said tube together at said seam whereby the weld is formed, a rotatable hammer movable about an axis transverse to that of the tube for delivering a series of blows upon said tube along the seam thereof subsequent to the formation of said weld, an anvil plug within said tube for resisting the blows of said hammer and means whereby said anvil plug is adjustable lengthwise of said tube.

In testimony whereof I have hereunto set my hand.

MAXWELL H. SUSSMAN.